United States Patent Office 2,887,513
Patented May 19, 1959

2,887,513

ACETOPHENETIDINE

Charles M. Eaker, Kirkwood, and John Robert Campbell, Webster Groves, Mo., assignors to Monsanto Chemical Company, St. Louis, Mo., a corporation of Delaware No Drawing. Application August 23, 1956
Serial No. 605,707

8 Claims. (Cl. 260—562)

This invention relates to acetophenetidine and more specifically pertains to the acetylation of p-phenetidine.

Heretofore acetophenetidine has been prepared by the acetylation of p-phenetidine with 50 percent or more excess of acetic anhydride in the presence or in the absence of acylation catalyst. The desired product, an analgesic, must be purified before it will meet the U.S.P. standards for its intended pharmaceutical use. Generally the crude product obtained from the acetylation step is dissolved in a solvent for acetophenetidine, the catalyst removed if one is employed, and the acetophenetidine recrystallized from the solution. However, not only is such a process time consuming, but also to meet the crystal size specification of this material the recrystallized product must be screened to remove the extremely fine crystalline particles.

A process has now been discovered whereby acetophenetidine can be obtained, of such a quality as to meet all U.S.P. specifications, directly from the reaction medium. This process comprises acetylating p-phenetidine with acetic anhydride in the presence of a hydrocarbon solvent having a boiling point about or a boiling point range of from about 90° to 250° C., at a reaction temperature of from 25° C. to about the boiling point of the reaction mixture and at least sufficient to keep acylation product in solution. It is preferred that the reaction be initially carried out at a temperature of from 50° C. to 100° C. and permitted to increase to a temperature from 100° C. to 110° C. by the heat of reaction. Obviously, since the product is employed as a pharmaceutical, the hydrocarbon solvent should be a non-toxic solvent and should have little or no odor imparting qualities. Certain grades of toluene, xylene and other alkyl substituted benzenes as well as paraffinic hydrocarbons will meet the solvent requirements for the process of this invention. The preferred solvents for use in the process of this invention are paraffinic, generally isoparaffinic, hydrocarbons and mixtures thereof having a boiling point of 90–250° C. and are such paraffinic hydrocarbons which are known as naphthas, especially the varnish makers' and painters' naphthas, ligroin, naphthas of the Stoddard solvent type, cleaners' naphtha, light naphtha, deodorized kerosene, mineral spirits, high flash mineral spirits, and the like. Although these paraffinic hydrocarbon materials are well known, they are mixtures of paraffinic hydrocarbons obtained during the fractionation of petroleum.

The process of this invention differs from the process for preparing aryl acid amides which employ benzene, lower alkyl acetates, chlorinated aliphatic hydrocarbons and the like as water entrainers since such processes employ only small amounts, about 5 percent by volume, of these solvents as water entrainers whereas the process of this invention employs larger amounts of the hydrocarbon solvents as a solvent to form a liquid reaction medium. The process of this invention also differs from the processes for the acylation of aromatic amines where small amounts of solvents are employed to aid in the driving off of water formed during the reaction in that far less acetic anhydride is employed. According to the process of this invention from about 0.85 up to not more than 0.99 mol of p-phenetidine per mol of acetic anhydride is supplied to the reaction mixture, that is, a slight excess of from 1 percent or less up to about 15 percent excess acetic anhydride is employed whereas the above noted processes of the acylation of aromatic amines employ an excess of acetic anhydride of from 25 percent and above.

The following specific examples are intended to illustrate the process of this invention and are not intended to be a limitation thereof. In these examples the term "parts" is employed to indicate parts by weight.

*Example I*

To a suitable reaction vessel there is added 107 parts of acetic anhydride and 54 parts of toluene. The resulting solution is heated with stirring to 75° C. To the hot toluene acetic anhydride slurry there is added slowly 137 parts of p-phenetidine and the temperature of the reaction mixture is permitted to increase to about 105° C. and there maintained during the addition of p-phenetidine which is accomplished in about 30 minutes. At the end of the addition of the amine the reaction mixture is heated to about 110° C. and there held for about 15 minutes. Thereafter the slurry is cooled at a rate of about 10 degrees an hour. When the cooling reaction medium reaches the temperature of about 85° C. it is seeded. After the cooling slurry reaches a temperature of about 5° C. the crystalline product which has formed is recovered by filtration and washed with benzene and dried. The dried product is lustrous thick crystal plates and is recovered in a yield of 167 parts, a 93.4 percent yield.

*Example II*

To a suitable reaction vessel there is charged 78 parts of acetic anhydride and 28 parts of a cleaners' naphtha of the Stoddard solvent type having a boiling point range of 150° C. to 202° C. and a flash point of about 38° C. The resulting mixture is stirred and heated to about 90° C., at which time the addition of 100 parts of p-phenetidine is begun and the reaction temperature is permitted to increase to about 105° C. by the heat of reaction. The p-phenetidine is added at such a rate that all of it is added in about 30 minutes. Thereafter the reaction mixture is heated to about 110° C. and there maintained for about 25 minutes and then cooled at the rate of about 10 degrees per hour. When the cooling reaction mixture reaches a temperature of about 95° C. it is seeded and permitted to cool at the same rate until it reaches about 5° C. The resulting slurry is filtered, the crystalline product is washed with water and dried. By this process acetophenetidine is recovered as lustrous thick plate crystals having a melting point of 134–136° C. Seventy percent of the crystalline product is retained on a 60 mesh screen.

*Example III*

To a reaction vessel there is added 117 parts of acetic anhydride and 60 parts of high flash mineral spirits, flash point about 45° C. and boiling point range of 163° C. to 205° C. The resulting solution is heated to about 85° C. with stirring and p-phenetidine is added thereto at the rate of about 5 parts per minute for 30 minutes. The temperature of the reaction mixture is permitted to increase to about 105 C. by the heat of reaction and there maintained all during the addition of the amine. After all the amine has been added the resulting mixture is heated to 110° C. and there held for 15 minutes after which the hot mixture is cooled at a rate of about 10 degrees an hour. When the resulting slurry reaches a temperature of about 5° C. the slurry is filtered, the crystalline product washed with water and dried. In this manner a yield of acetophenetidine in excess of 95 percent is obtained in the form of lustrous thick plate crystals, over 70 percent of which are retained on a 60 mesh screen. This product also has a melting point of 134–136° C.

*Example IV*

There is combined in a reaction vessel 78 parts of acetic anhydride and 30 parts of a varnish makers' and painters' naphtha having a boiling range of from 115° C. to 145° C. The resulting solution is stirred and heated to about 75° C. To the resulting hot solution there is added 100 parts of p-phenetidine at the rate of about 5 parts per minute with stirring. During the addition of the amine the reaction temperature is allowed to increase to about 105° C. by the heat of reaction. After all of the amine has been added the reaction temperature is permitted to increase to 110° C. and there held for about 15 minutes. The resulting hot solution is cooled at the rate of about 10 degrees an hour. When the cooling solution reaches a temperature of about 85° C. it is seeded and permitted to continue to cool at the rate of 10 degrees an hour. After the resulting solution reaches a temperature of about 5° C. it is filtered, washed with petroleum ether and cold water and dried. In this manner, acetophenetidine having a melting point of 134–136° C. in the form of lustrous thick plate crystals is obtained in a yield of about 95 percent. More than 70 percent of the crystalline product obtained by this process is retained on a 60 mesh screen.

As hereinbefore stated solvents other than those illustrated in the above examples can be used. For example, cleaners' naphtha having a flash point of 60° C. can be employed in place of the solvents employed in the processes of the illustrated examples. Also, xylene can be used to replace the toluene used as the solvent in Example I.

It has been found that the process of this invention will give the best results when the reaction temperature is maintained at 90°–110° C., preferably 100°–105° C., during the addition of the amine. However, an initial portion of the amine can be added at a lower temperature as illustrated and the heat of reaction employed to raise the reaction medium to the desired reaction temperature. As for the end of the addition of the amine the cooling of the reaction mixture can be stopped and the heat of the reaction employed to heat the reaction mixture to about 110°–115° C. The upper limit of 115° C. is not at all critical. However, since the resulting solution must be cooled to recover the desired product there is little reason to heat the reaction mixture to any higher temperature. The rate of cooling can be varied as desired. However, cooling the reaction mixture at the rate of about 10 degrees an hour does not require any unusual equipment or excessively high cooling load. Consequently the rate of 10 degrees an hour is satisfactory for industrial practice.

Other modifications and variations will be apparent to those skilled in the art. Therefore it is not intended that the process of this invention be limited by the foregoing examples, but rather any of such modifications and variations coming within the spirit and scope of this invention as defined in the appended claims shall be part of the process of this invention.

In the above examples, it is seen that the ratio of solvent to p-phenetidine ranges from about 40 ml. per gram-mol of p-phenetidine to about 65 ml. per gram-mol of p-phenetidine. By keeping the amount of hydrocarbon solvent within this range, the maximum yield of acetophenetidine is obtained while maintaining the desired attributes of crystal size, form, color, and odor necessary to meet U.S.P. requirements.

What is claimed is:

1. In a process for preparing acetophenetidine, the step comprising acetylating the amino group of p-phenetidine by reacting p-phenetidine with acetic anhydride in a liquid hydrocarbon medium, the quantity of said liquid hydrocarbon medium being within the range of about 40 ml. to about 65 ml. per gram-mol of p-phenetidine supplied to the reaction mixture, and said liquid hydrocarbon medium being free from olefinic unsaturation and boiling within the range of about 90° C. to about 250° C.

2. In a process for preparing acetophenetidine, the step comprising acetylating the amino group of p-phenetidine by reacting p-phenetidine with acetic anhydride in a liquid hydrocarbon medium, the quantity of p-phenetidine being from about 0.85 to not more than 0.99 mol per mol of acetic anhydride supplied to the reaction mixture, the quantity of said liquid hydrocarbon medium being within the range of about 40 ml. to about 65 ml. per gram-mol of p-phenetidine supplied to the reaction mixture, said liquid hydrocarbon medium being free from olefinic unsaturation and boiling within the range of about 90° C. to about 250° C.

3. In a process of claim 2 wherein the liquid hydrocarbon boils within the range of about 105° C. to about 210° C.

4. In a process of claim 3 wherein the liquid hydrocarbon is an aromatic hydrocarbon.

5. In a process of claim 3 wherein the liquid hydrocarbon is toluene.

6. In a process of claim 3 wherein the liquid hydrocarbon is xylene.

7. In a process of claim 2 wherein the liquid hydrocarbon is a petroleum naphtha.

8. The process for preparing acetophenetidine comprising acetylating the amino group of phenetidine by reacting p-phenetidine with acetic anhydride in a liquid hydrocarbon free from olefinic unsaturation boiling in the range of about 90° C. to about 250° C., from about 0.85 mol to not more than 0.99 mol of p-phenetidine per mol of acetic anhydride being supplied to the reaction mixture, the amount of said liquid hydrocarbon being in the range of about 40 ml. to about 65 ml. per gram-mol of p-phenetidine, the temperature of the reaction mixture being sufficiently high to keep the acetophenetidine produced in solution, thereafter cooling the reaction mixture and separating crystallized acetophenetidine therefrom.

References Cited in the file of this patent

UNITED STATES PATENTS

| | | |
|---|---|---|
| 2,145,617 | Adams | Jan. 21, 1939 |
| 2,462,221 | Pemberton | Feb. 22, 1949 |
| 2,694,071 | Jacob et al. | Nov. 9, 1954 |

OTHER REFERENCES

Richardson: Journal of the Society of the Chemical Industry, vol. 45: pages 202T–3T (Transactions), (1926).